G. KINSEY.
ANGLING CLIP.
APPLICATION FILED JULY 2, 1917.

1,250,189.

Patented Dec. 18, 1917.

Witnesses:
F. E. Arthur,
V. Thornton Bogert

Inventor
George Kinsey
By Walter F. Murray
Attorney

UNITED STATES PATENT OFFICE.

GEORGE KINSEY, OF CINCINNATI, OHIO.

ANGLING-CLIP.

1,250,189.  Specification of Letters Patent.  Patented Dec. 18, 1917.

Application filed July 2, 1917. Serial No. 178,067.

*To all whom it may concern:*

Be it known that I, GEORGE KINSEY, a citizen of the United States of America, and resident of Cincinnati, in the county of Hamilton and State of Ohio, have invented a new and useful Improvement in Angling-Clips, of which the following is a specification.

An object of my invention is to produce an improved clip for securing the bait, hook and sinker to a fishing line, to be particularly employed in those branches of the art of angling, known as trawling and casting.

A further object is to produce a clip for securing bait, hook and sinker to a fishing line for the purpose of trawling and casting, which is cheaper to produce, easy to attach, and efficient and indestructible in operation.

These and other objects are attained in the angling clip described in the following specification and illustrated in the accompanying drawings, in which.

Figure 1:
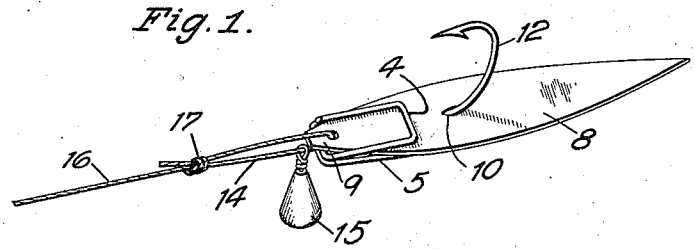
Figure 1 is a perspective view of my improved clip attached to a fishing line, a hook, bait, and a dipsey sinker, comprising a device to be used in trawling and casting.
Figure 2:
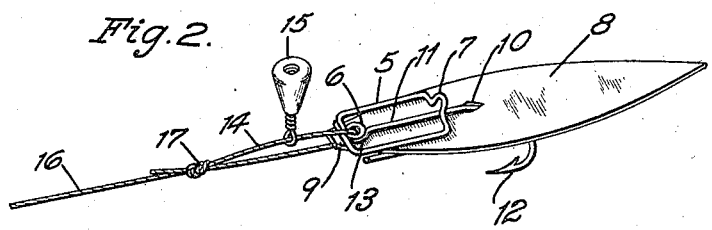
Fig. 2 is an inverted perspective view of the device disclosed in Fig. 1.
Figure 3:
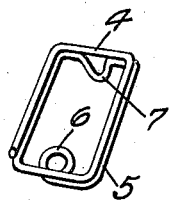
Fig. 3 is a perspective view of my improved clip.

My improved clip is a spiral wire frame preferably of rectangular formation having two convolutions 4 and 5. The uppermost convolution, as viewed in Figs. 1 and 3, is a plane rectangle. The lowermost convolution has an eye 6 formed at its end and a loop 7 formed opposite the eye and extending downwardly.

My improved clip is used with the usually shaped pork rind which is prepared by scraping off the fat and cutting it to a shape which resembles a minnow. I place this piece of rind 8 between the upper and lower convolutions of my clip, its blunt end 9 being positioned beyond eye 6 of the clip, the pointed or tail end of the rind extending to the rear. A small opening 10 is provided in the rind just back of loop 7 for the passage therethrough of the shank 11 of a fishing hook 12. Hook 12 is of the type having an eye 13 and this eye is placed between eye 6 of the clip and the rind. The shank of the hook rests in loop 7, so that the hook is held in alinement by loop 7 and eye 6. In this position the fishing line is threaded through eye 6 of the clip, eye 13 of the fishing hook and through the rind. Upon the projecting end 14 of the fishing line a small dipsey sinker 15 is then suspended, the end being secured to the main portion 16 of the fishing line by a suitable non-slipping knot 17 formed therein.

With the device thus assembled its action is as follows: the dipsey sinker acts to maintain the clip, the rind, and the hook in the positions disclosed in Fig. 1, while being drawn through the water. This is particularly true when the device is being drawn over the tops of weeds growing in the water, the sinker acting under these conditions to maintain the point of the hook uppermost. Since the pork rind is pliable, its action in being drawn through the water is to vibrate in an undulating or waving motion characteristic of the motions of a minnow passing through the water.

I have found that my improved clip not only holds the bait in position to prevent its curling in the water, but it also holds it firm enough to prevent its displacement either when being drawn over an obstruction in the water or when attacked by a fish. I have shown the bait, the hook, the clip, and the sinker, as being secured by a loop formed directly in the fishing line. This is the cheapest and simplest manner of attaching the clip and its connected elements to the line, but any of the well known snaps may be employed for this purpose. Although the form of the clip disclosed is rectangular it is merely illustrative of a preferred form of my invention.

Having thus described my invention, what I claim is;

1. An angling clip consisting of a spiral wire frame, having an upper and a lower convolution, the upper convolution being plain and the lower convolution having an eye formed within it at its free end and a loop intermediate the ends of the frame and in a plane at right angles to the plane of its convolution.

2. An angling clip consisting of a spiral wire frame having a rectangular formation and an upper and a lower convolution, the upper convolution being a plain rectangle and the lower convolution conforming to the upper convolution and having an eye formed within it at its free end and a loop intermediate the ends of the spiral and opposite the eye and in a plane at right angles to the plane of its convolution.

3. In combination, a fishing hook, a strip of bait, and a spiral wire frame having a series of convolutions, an eye formed at one end of the wire and a loop between the ends of the wire, said bait being adapted to be located between adjacent convolutions of the clip, and said hook being adapted to be located with its attaching end adjacent to the eye in position to be secured by a line passing through the eye and bait, and its shank occupying the loop adjacent to the bait.

In testimony whereof, I have hereunto subscribed my name this 30 day of June, 1917.

GEORGE KINSEY.

Witnesses:
  WALTER F. MURRAY,
  W. THORNTON BOGERT.

Copies of this patent may be obtained for five cents each, by addressing the "Commissioner of Patents, Washington, D. C."